Sept. 9, 1924. Re. 15,911

N. GELB

SANITARY MOUTHPIECE

Original Filed March 15, 1922

INVENTOR:
Nathan Gelb
BY
Fraentzel and Richards
ATTORNEYS

Reissued Sept. 9, 1924. Re. 15,911

UNITED STATES PATENT OFFICE.

NATHAN GELB, OF NEWARK, NEW JERSEY.

SANITARY MOUTHPIECE.

Original No. 1,425,958, dated August 15, 1922, Serial No. 543,870, filed March 15, 1922. Application for reissue filed August 11, 1923. Serial No. 656,906.

*To all whom it may concern:*

Be it known that I, NATHAN GELB, a citizen of the United States, residing at Newark, in the county of Essex and State of New Jersey, have invented new and useful Improvements in Sanitary Mouthpieces, of which the following is a specification.

The present invention consists in sanitary mouthpieces for telephones, and the like; and the same comprises in connection with the usual mouthpiece-body of a telephone, a member in the form of a jacket adapted to be arranged about the said mouthpiece-body in a manner so as to provide an annular space between said mouthpiece-body and said jacket, for the reception and arrangement in said space of an absorbent material designed to be impregnated with a disinfectant agent, or with a perfume, as may be desired.

The object of my said invention is the provision of a simple, practical and efficient sanitary mouth piece for telephones, speaking tubes and the like, the said mouth piece being characterized by a construction which permits of the disinfectant-carrying members being expeditiously and easily renewed when occasion demands.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
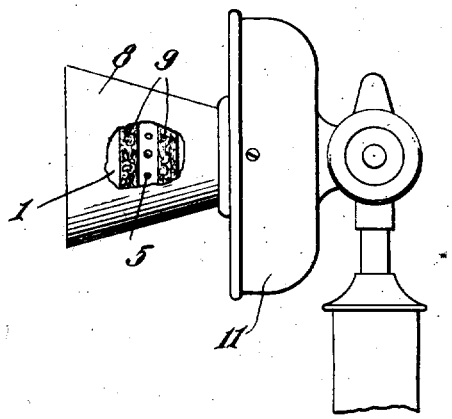
Figure 1 is a view showing my novel mouth piece partly in side elevation and partly broken away, as applied to a telephone.

The mouth piece member of my novel mouth piece is designated by 1. It may be formed of any material compatible with its purpose, and includes a forward reduced and threaded end portion 2, a rearwardly flared portion 3 and a foraminous diaphragm 4, the latter being spaced from the forward end of the member and arranged at the forward end of the flared portion 3, as illustrated. Formed in the flared portion of the member 1 at an intermediate point in the length of said portion is a circular series of apertures 5, which extend throughout the thickness of the said flared portion.

Figure 2:
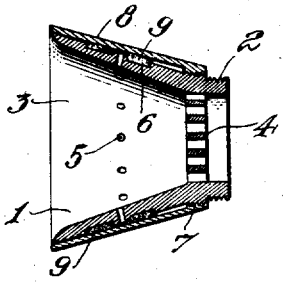
Figure 2 is a diametrical section of the improvement per se.
Figure 3:
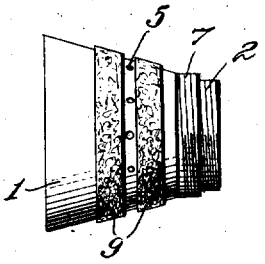
Figure 3 is a detail side elevation showing the mouth piece member of the improvement.
Figure 4:
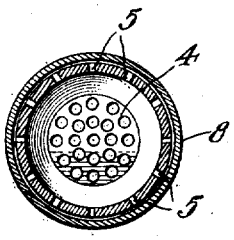
Figure 4 is a transverse section taken through the complete device.

Arranged in the outer side of the portion 3 and disposed at opposite sides of the said circular series of apertures are annular grooves 6. It will also be noticed by particular reference to Figures 2 and 3 that the member 1 is exteriorly threaded as designated by 7 in transverse coincidence with the said diaphragm 4.

In addition to the mouth piece member or body 1 characterized as described, my improvement comprises a jacket 8 of hard rubber, glass or any other appropriate material, and two annuli 9 of absorbent material surrounding the member 1 and seated in the before mentioned groove 6, and designed to be impregnated with a disinfecting agent or with perfume as may be deemed most expedient. The jacket 8 is provided at its forward end with an inwardly directed annular flange interiorly threaded as illustrated to engage the thread 7 of the member 1 and thereby detachably secure the jacket 8 on the member 1 after the manner shown in Figure 2.

It will be manifest from the foregoing that my novel mouth piece is adapted to be attached to and removed from a telephone member 11 in the ordinary well known manner; also, that when the mouth piece as a whole is detached from the member 11, the jacket 8 may be expeditiously and easily removed from the member 1 so as to permit of the annuli 9 being provided with a fresh supply of disinfectant or the like. It will also be manifest that the said annuli 9 can be conveniently immersed in disinfectant, the member 1 being used as a handle for such purpose.

After the annuli 9 are supplied with disinfectant as indicated, the jacket 8 is replaced and secured on the member 1, after which the portion 2 of the said member 1, is connected to the telephone member 11 in the ordinary well known manner.

In the practical use of my novel mouth piece it will be understood that the fumes given off by the impregnated annuli 9 will occupy the annular space between the member 1 and the jacket 8 and will enter the member 1 through the apertures 5 therein, with the result that the mouth piece as a whole will be rendered sanitary and not liable to transmit disease.

I have entered into a detailed description of the construction and relative to arrangement of the parts embraced in the present preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. A sanitary mouthpiece, comprising a mouthpiece-body adapted to be attached to a telephone, or the like, said mouth-piece having a pair of externally screw-threaded portions, a member in the form of a jacket surrounding said mouthpiece-body so as to provide an annular space between said mouthpiece-body and the said jacket, said jacket having an internally screw-threaded portion screwed upon one of the externally screw-threaded portions of the mouth-piece, and an absorbent material disposed in said space, said material being adapted to be impregnated with a disinfectant material, or the like.

2. A mouthpiece or body-member provided in its exterior surface with an annular groove, said mouth-piece being also provided with an externally screwthreaded portion, an absorbent material in said groove, and a jacket surrounding said body-member and said material, said jacket having an internally screw-threaded portion screwed upon the externally screw-threaded portion of the said mouth-piece.

3. A mouth piece for telephones, speaking tubes and the like comprising a mouth piece or body member adapted at its forward end for its detachable connection to a telephone or speaking tube and having a rearwardly flared portion and an exterior thread at the forward end thereof and also having a circular series of apertures in said portion at an intermediate point in the length thereof, and exterior grooves at opposite sides of said apertures, absorbent annuli arranged in said grooves, and a removable jacket snugly receiving the said mouth piece or body member and the annuli and having at its forward end an interiorly threaded flange engaging the thread on said mouth piece or body member.

4. A mouth piece or body member with apertures in its wall and grooves in its outer side at opposite sides of said apertures, in combination with absorbent annuli in said grooves, and a jacket surrounding said member and annuli and detachably connected at its forward end to the member.

In testimony, that I claim the invention set forth above I have hereunto set my hand this 7th day of August, 1923.

NATHAN GELB.

Witnesses:
FREDK. C. FRAENTZEL,
EVA E. DESCH.